United States Patent
Iwakawa et al.

(10) Patent No.: US 12,429,438 B2
(45) Date of Patent: Sep. 30, 2025

(54) X-RAY INSPECTION DEVICE

(71) Applicant: ISHIDA CO., LTD., Kyoto (JP)

(72) Inventors: Ken Iwakawa, Ritto (JP); Osamu Hirose, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 344 days.

(21) Appl. No.: 18/157,548

(22) Filed: Jan. 20, 2023

(65) Prior Publication Data

US 2023/0243764 A1    Aug. 3, 2023

(30) Foreign Application Priority Data

Feb. 2, 2022   (JP) .................... 2022-015122

(51) Int. Cl.
  *G01N 23/18*   (2018.01)
  *G06T 5/50*    (2006.01)
  *G06T 7/00*    (2017.01)
  *G06V 10/60*   (2022.01)

(52) U.S. Cl.
  CPC ........... *G01N 23/18* (2013.01); *G06T 5/50* (2013.01); *G06T 7/0008* (2013.01); *G06V 10/60* (2022.01); *G01N 2223/643* (2013.01); *G06T 2207/20224* (2013.01)

(58) Field of Classification Search
  CPC ........... G01N 23/18; G01N 2223/424; G01N 2223/643; G06T 5/50
  See application file for complete search history.

(56) References Cited

U.S. PATENT DOCUMENTS

| | | | | |
|---|---|---|---|---|
| 2010/0046703 A1* | 2/2010 | Hirose | ................ | G01G 9/005 378/54 |
| 2023/0128795 A1* | 4/2023 | Onishi | ................ | G06V 10/751 378/62 |
| 2023/0175984 A1* | 6/2023 | Yoshida | ................ | G06T 5/50 382/168 |

FOREIGN PATENT DOCUMENTS

| | | |
|---|---|---|
| JP | 2010-091483 A | 4/2010 |
| JP | 2012-073056 A | 4/2012 |
| JP | 6979672 B2 * | 12/2021 |

OTHER PUBLICATIONS

Extended Search Report in the corresponding European Patent Application No. 23153190.6 dated Jun. 6, 2023.

* cited by examiner

*Primary Examiner* — David P Porta
*Assistant Examiner* — Casey Bryant
(74) *Attorney, Agent, or Firm* — Global IP Counselors, LLP (57) ABSTRACT

An X-ray inspection device includes a transport unit, an X-ray irradiation unit configured to irradiate an article with X-rays, an X-ray detection unit configured to detect the X-rays in each of a plurality of energy bands, an X-ray transmission image generation unit configured to generate a plurality of X-ray transmission images on the basis of the X-rays in each of the plurality of energy bands, and an inspection unit configured to inspect whether or not a foreign matter is present or absent in the article on the basis of a difference image between the plurality of generated X-ray transmission images. The inspection unit detects a first foreign matter having a higher specific gravity than the article using a first threshold value and detects a second foreign matter having a lower specific gravity than the (Continued)

article using a second threshold value different from the first threshold value.

4 Claims, 4 Drawing Sheets

X-RAY INSPECTION DEVICE

TECHNICAL FIELD

An aspect of the present invention relates to an X-ray inspection device.

BACKGROUND

For example, a device described in Japanese Unexamined Patent Publication No. 2012-73056 is known as an X-ray inspection device. The X-ray inspection device described in Japanese Unexamined Patent Publication No. 2012-73056 includes an X-ray source that irradiates an object (article) to be inspected with X-rays, a sensor unit including a first sensor that detects X-rays in a first energy band and a second sensor that detects X-rays in a second energy band emitted from the X-ray source, an image generation unit that generates a first transmission image and a second transmission image of the object to be inspected on the basis of X-ray data detected by the first sensor and the second sensor, and an inspection unit that inspects whether or not a foreign matter is present or absent in the article on the basis of the images generated by the image generation unit.

SUMMARY

In the above-described X-ray inspection device, it is possible to detect, for example, a foreign matter having a higher specific gravity than the article, but it may be difficult to detect a foreign matter having a lower specific gravity than the article.

An object of an aspect of the invention is to provide an X-ray inspection device that can detect both a foreign matter having a higher specific gravity than an article and a foreign matter having a lower specific gravity than the article.

According to an aspect of the invention, there is provided an X-ray inspection device including: a transport unit configured to transport an article; an X-ray irradiation unit configured to irradiate the article transported by the transport unit with X-rays; an X-ray detection unit configured to detect the X-rays, which have been emitted by the X-ray irradiation unit and transmitted through the article, in each of a plurality of energy bands; an X-ray transmission image generation unit configured to generate a plurality of X-ray transmission images on the basis of the X-rays in each of the plurality of energy bands detected by the X-ray detection unit; and an inspection unit configured to inspect whether or not a foreign matter is present or absent in the article on the basis of a difference image between the plurality of X-ray transmission images generated by the X-ray transmission image generation unit. The inspection unit detects a first foreign matter having a higher specific gravity than the article using a first threshold value and detects a second foreign matter having a lower specific gravity than the article using a second threshold value different from the first threshold value.

For example, in the difference image, when the first foreign matter having a higher specific gravity than the article appears bright, the second foreign matter, such as plastic, having a lower specific gravity than the article appears dark. Therefore, in the X-ray inspection device according to the aspect of the invention, two threshold values for foreign matter inspection based on the difference image are provided, the first foreign matter can be detected using the first threshold value which is one of the two threshold values, and the second foreign matter can be detected using the second threshold value which is the other threshold value. That is, it is possible to detect both a foreign matter having a higher specific gravity than the article and a foreign matter having a lower specific gravity than the article.

The X-ray inspection device according to the aspect of the invention may further include an input unit configured to receive a user input, and the first threshold value and the second threshold value may be capable of being independently set through the input unit. In this case, it is possible to set each of the first threshold value and the second threshold value to a desired value and to easily respond to the detection of various first and second foreign matters.

In the X-ray inspection device according to the aspect of the invention, the inspection unit may detect a foreign matter on the basis of a luminance distribution of the difference image. In this case, it is possible to detect both the first foreign matter and the second foreign matter using the luminance distribution of the difference image.

In the X-ray inspection device according to the aspect of the invention, the first threshold value may be a luminance value that is greater than a reference luminance value corresponding to the article, the second threshold value may be a luminance value smaller than the reference luminance value, and the inspection unit may detect one of the first foreign matter and the second foreign matter when there is a luminance value greater than the first threshold value in the luminance distribution of the difference image and detect the other of the first foreign matter and the second foreign matter when there is a luminance value smaller than the second threshold value in the luminance distribution of the difference image. In this case, it is possible to detect both the first foreign matter and the second foreign matter specifically using the luminance distribution of the difference image.

In the X-ray inspection device according to the aspect of the invention, the first threshold value and the second threshold value may be luminance values that are greater or smaller than a reference luminance value corresponding to the article, and the inspection unit may detect one of the first foreign matter and the second foreign matter when there is a luminance value greater or smaller than the first threshold value in the luminance distribution of the difference image, invert positive and negative of the luminance distribution of the difference image, and detect the other of the first foreign matter and the second foreign matter when there is a luminance value greater or smaller than the second threshold value in the luminance distribution of the difference image. In this case, it is possible to detect both the first foreign matter and the second foreign matter specifically using the inverted luminance distribution.

According to an aspect of the invention, it is possible to provide an X-ray inspection device that can detect both a foreign matter having a higher specific gravity than an article and a foreign matter having a lower specific gravity than the article.

DETAILED DESCRIPTION

Hereinafter, an embodiment will be described in detail with reference to the accompanying drawings. In the description of the drawings, the same or corresponding elements are denoted by the same reference numerals, and the redundant description thereof will be omitted.

Figure 1:
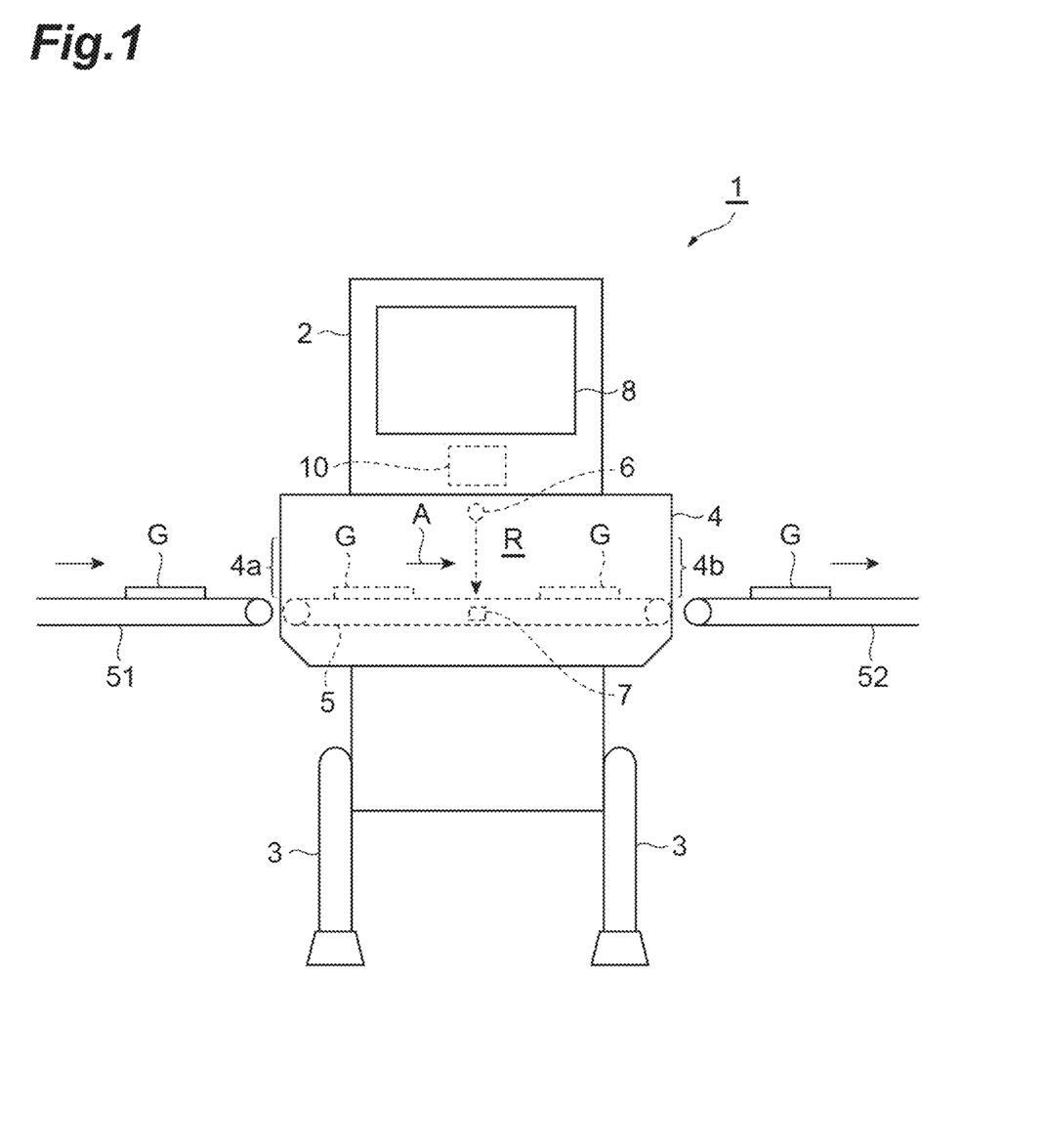
FIG. 1 is a diagram showing a configuration of an X-ray inspection device according to an embodiment.

As shown in FIG. 1, an X-ray inspection device 1 includes a device main body 2, support legs 3, a shield box 4, a transport unit 5, an X-ray irradiation unit 6, an X-ray detection unit 7, a display operation unit 8, and a control unit 10. The X-ray inspection device 1 generates an X-ray transmission image of an article G while transporting the article G and inspects the article G on the basis of the X-ray transmission image. The article G is not particularly limited and is, for example, meat (minced meat) in this embodiment. The inspection of the articles G is, for example, an inspection of the number of stored items, an inspection of foreign matters, an inspection of missing items, an inspection of cracks and chips, or the like.

The article G before inspection is carried into the X-ray inspection device 1 by a carry-in conveyor 51. The article G after inspection is carried out from the X-ray inspection device 1 by a carry-out conveyor 52. The article G determined to be defective by the X-ray inspection device 1 is sorted out of a production line by a sorting device (not shown) that is disposed on a downstream side of the carry-out conveyor 52. The article G determined to be non-defective by the X-ray inspection device 1 passes through the sorting device as it is.

The device main body 2 accommodates the control unit 10 and the like. The support legs 3 support the device main body 2. The shield box 4 is provided in the device main body 2. The shield box 4 prevents the leakage of X-rays (electromagnetic waves) to the outside. An inspection region R in which the article G is inspected by X-rays is provided in the shield box 4. A carry-in port 4a and a carry-out port 4b are formed in the shield box 4. The article G before inspection is carried from the carry-in conveyor 51 into the inspection region R through the carry-in port 4a. The article G after inspection is carried out from the inspection region R to the carry-out conveyor 52 through the carry-out port 4b.

The transport unit 5 transports the article G along a transport direction A from the carry-in port 4a to the carry-out port 4b through the inspection region R. The transport unit 5 is, for example, a belt conveyor that extends between the carry-in port 4a and the carry-out port 4b.

Figure 2:
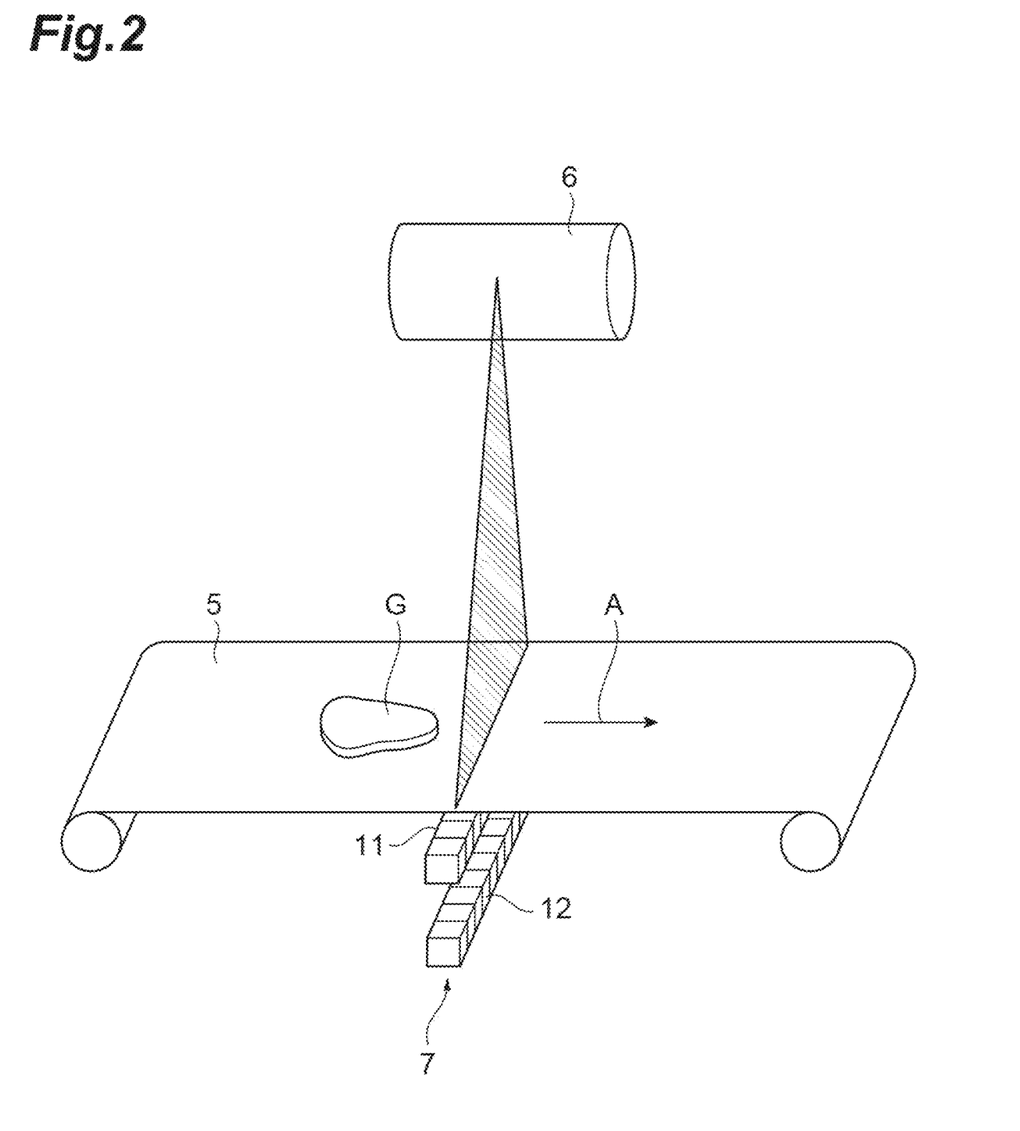
FIG. 2 is a diagram showing an internal configuration of a shield box shown in FIG. 1.

As shown in FIGS. 1 and 2, the X-ray irradiation unit 6 is disposed in the shield box 4. The X-ray irradiation unit 6 irradiates the article G transported by the transport unit 5 with X-rays. The X-rays emitted from the X-ray irradiation unit 6 include X-rays in various energy bands from low energy (long wavelength) to high energy (short wavelength). In addition, "low" and "high" in the low energy band and the high energy band described above indicate relatively "low" and "high" among a plurality of energy bands of X-rays emitted from the X-ray irradiation unit 6 and do not indicate a specific range. In this embodiment, the X-ray irradiation unit 6 emits at least X-rays (first electromagnetic waves) in a first energy band which corresponds to the low energy band and X-rays (second electromagnetic waves) in a second energy band which is higher than the first energy band and corresponds to the high energy band.

The X-ray detection unit 7 is disposed in the shield box 4. The X-ray detection unit 7 detects the X-rays, which have been emitted by the X-ray irradiation unit 6 and transmitted through the article G, in each of a plurality of energy bands. The X-ray detection unit 7 is configured to detect X-rays in the low energy band and X-rays in the high energy band. The X-ray detection unit 7 has a first line sensor 11 and a second line sensor 12. Each of the first line sensor 11 and the second line sensor 12 is composed of a plurality of X-ray detection elements which are arranged one-dimensionally along a horizontal direction perpendicular to the transport direction A. The first line sensor 11 detects the X-rays in the low energy band which have been transmitted through the article G and the conveyor belt of the transport unit 5. The second line sensor 12 detects the X-rays in the high energy band which have been transmitted through the conveyor belt of the transport unit 5 and the first line sensor 11.

As shown in FIG. 1, the display operation unit 8 is provided in the device main body 2. The display operation unit 8 displays various types of information and receives the input of various conditions. The display operation unit 8 is, for example, a liquid crystal display and displays an operation screen as a touch panel. In this case, the user can input various conditions through the display operation unit 8. The display operation unit 8 constitutes an input unit that receives the user input.

The control unit 10 is disposed in the device main body 2. The control unit 10 controls the operation of each unit (in this embodiment, the transport unit 5, the X-ray irradiation unit 6, the X-ray detection unit 7, the display operation unit 8, and the sorting device (not shown) disposed on the downstream side of the X-ray inspection device 1) of the X-ray inspection device 1. The control unit 10 includes a processor, such as a central processing unit (CPU), memories, such as a read only memory (ROM) and a random access memory (RAM), and a storage, such as a solid state drive (SSD). A program for controlling the X-ray inspection device 1 is recorded on the ROM.

Detection results of the X-ray detection unit 7 are input to the control unit 10. In this embodiment, the detection result of the X-rays in the low energy band is input from the first line sensor 11 of the X-ray detection unit 7 to the control unit 10, and the detection result of the X-rays in the high energy band is input from the second line sensor 12 of the X-ray detection unit 7 to the control unit 10. The control unit 10 generates a plurality of X-ray transmission images on the basis of the X-rays in each of a plurality of energy bands detected by the X-ray detection unit 7.

Figure 3A:
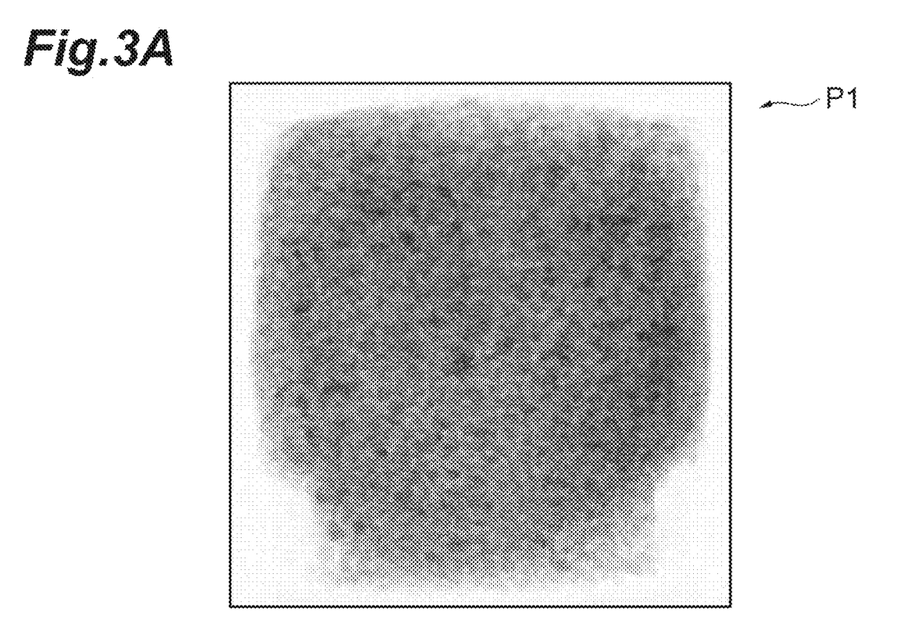
FIG. 3A is a diagram showing a first transmission image.
Figure 3B:
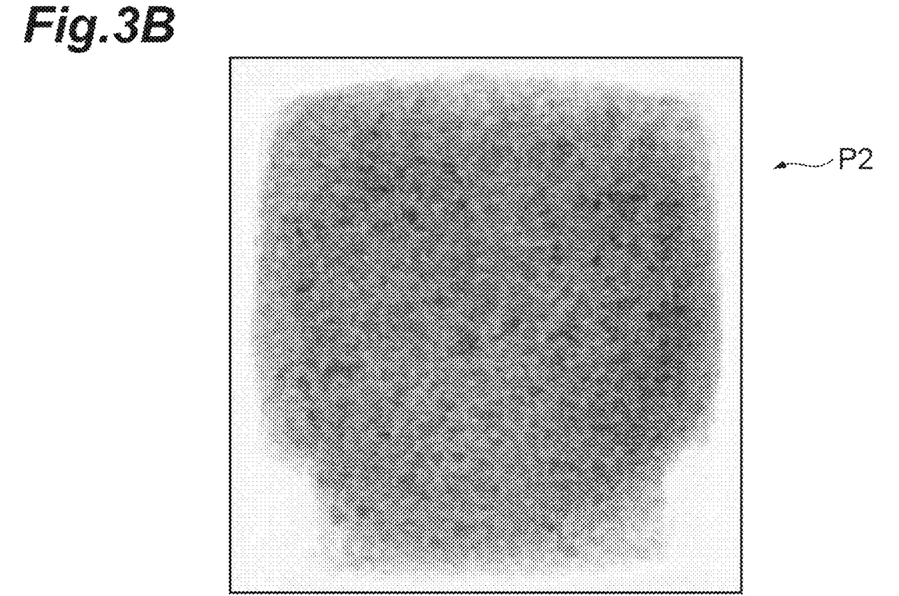
FIG. 3B is a diagram showing a second transmission image.

As shown in FIG. 3A, the control unit 10 generates a first transmission image P1 as the X-ray transmission image on the basis of the detection result of the X-rays in the low energy band by the first line sensor 11. As shown in FIG. 3B, the control unit 10 generates a second transmission image P2 as the X-ray transmission image on the basis of the detection result of the X-rays in the high energy band by the second line sensor 12. At least one of the article G and a background other than the article G is reflected in each of the first transmission image P1 and the second transmission image P2. As in the example shown in FIG. 3A, the first transmission image P1 is overall darker than the second transmission image P2. On the other hand, as in the example shown in FIG. 3B, the second transmission image P2 is overall brighter than the first transmission image P1. The comparison between the brightness of the first transmission image P1 and the brightness of the second transmission image P2 corresponds to the comparison between the brightness of the article G displayed in the first transmission image P1 and the brightness of the article G displayed in the second transmission image P2.

The control unit 10 performs image processing including a subtraction process on the first transmission image P1 and the second transmission image P2 to generate a difference image obtained by extracting the difference between the first transmission image P1 and the second transmission image P2. For example, the control unit 10 matches luminance values (gradation values) of portions corresponding to the article G between the first transmission image P1 and the second transmission image P2, performs a difference process of calculating the difference between the luminance values of pixels of the portions, and acquires a difference image that has been processed such that the difference between the luminance value of a pixel corresponding to a foreign matter and the luminance value of a pixel not corresponding to the foreign matter is large. Here, the control unit 10 may perform the image processing on at least one of the first transmission image P1 and the second transmission image P2, using an image processing algorithm.

The image processing algorithm is configured by one image processing filter or a combination of a plurality of image processing filters. The image processing algorithm can be acquired from the outside through a network such as the Internet. The image processing algorithm can also be acquired from an external storage medium such as a USB memory or a removable hard disk. The image processing algorithm can be automatically generated from a plurality of image processing filters on the basis of, for example, the specifications or inspection conditions of the X-ray inspection device 1, adopting a genetic algorithm (GA) which is a method applying the mechanism of heredity and evolution in the living world and. The image processing algorithm can also be appropriately set by the user through the display operation unit 8.

Figure 4:
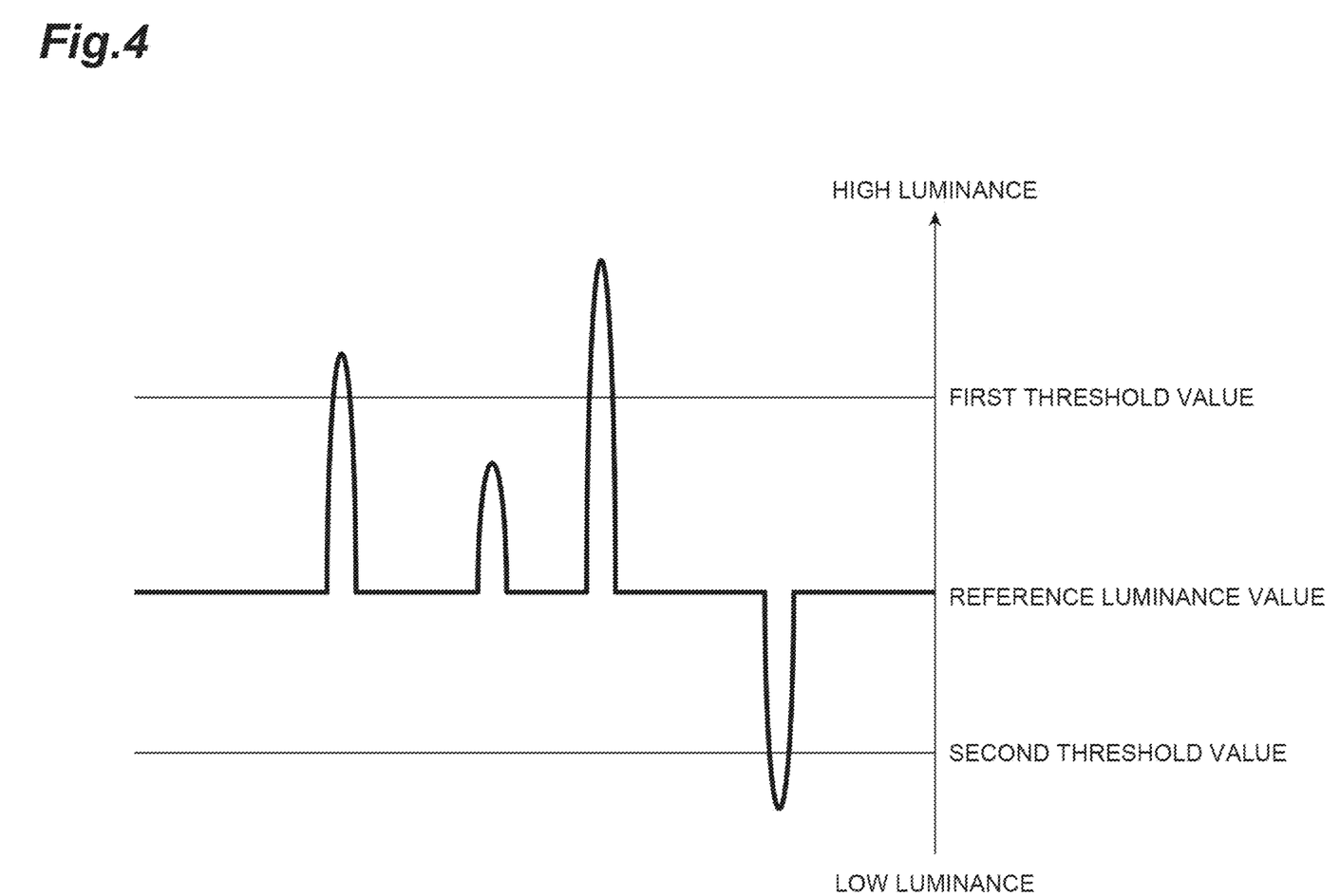
FIG. 4 is a graph schematically showing an example of a luminance distribution of a difference image.

FIG. 4 is a graph schematically showing an example of the luminance distribution of the difference image. In FIG. 4, the vertical axis corresponds to luminance, and the horizontal axis corresponds to a position along the transport direction A (each pixel of the difference image). The control unit 10 inspects whether or not a foreign matter is present or absent in the article G on the basis of the generated difference image. The control unit 10 detects the foreign matter on the basis of the luminance distribution of the difference image. The control unit 10 detects a first foreign matter having a higher specific gravity than the article G using a first threshold value and detects a second foreign matter having a lower specific gravity than the article G using a second threshold value different from the first threshold value. Specifically, the control unit 10 detects the first foreign matter when there is a luminance value greater than the first threshold value in the luminance distribution of the difference image. The control unit 10 detects the second foreign matter when there is a luminance value smaller than the second threshold value in the luminance distribution of the difference image.

As shown in FIG. 4, the first threshold value is a luminance value greater than a reference luminance value which is a luminance value corresponding to the article G. The reference luminance value is, for example, 0 and also corresponds to the background of the difference image. The first threshold value is a foreign matter determination threshold for determining whether the first foreign matter is present or absent. The second threshold value is a foreign matter determination threshold value for determining whether the second foreign matter is present or absent. The second threshold value is a luminance value smaller than the reference luminance value. The first threshold value and the second threshold value can be individually set through the display operation unit 8. The first threshold value and the second threshold value may be appropriately set by, for example, a test according to the properties of the article G. For example, an absolute value of the first threshold value may be greater than an absolute value of the second threshold value.

The first foreign matter is, for example, metal that is buried in the article G and is composed of an element heavier than an element of the article G. The first foreign matter corresponds to, for example, a bright portion in the difference image. The second foreign matter is, for example, plastic that sticks to the outer surface of the article G and is composed of an element that is lighter than the element of the article G. The second foreign matter corresponds to, for example, a dark portion in the difference image. The control unit 10 stores the inspection result of the foreign matter in the storage. The control unit 10 constitutes an X-ray transmission image generation unit and an inspection unit.

In the example shown in FIG. 4, in the luminance distribution of the difference image, the luminance value is larger than the first threshold value (that is, a significantly bright portion is present in the difference image), and it can be determined that the first foreign matter is included in the article. In addition, in the luminance distribution of the difference image, the luminance value is smaller than the second threshold value (that is, a significantly dark portion is present in the difference image), and it can be determined that the second foreign matter is included in the article. Further, when the luminance value is equal to or smaller than the first threshold value and equal to or greater than the second threshold value in the luminance distribution of the difference image (that is, when the brightness of the difference image is the same as that of the background), it can be determined that there is no foreign matter in the article.

Next, an example of an X-ray inspection method performed by the X-ray inspection device 1 will be described.

The X-ray irradiation unit 6 irradiates the article G, which is being transported in the shield box 4 by the transport unit 5, with X-rays in the first energy band and the second energy band, and the X-ray detection unit 7 detects the X-rays. Then, the control unit 10 generates the first transmission image P1 on the basis of the detection result of the X-rays in the first energy band and generates the second transmission image P2 on the basis of the detection result of the X-rays in the second energy band.

Then, the control unit 10 performs image processing including the subtraction process on the first transmission image P1 and the second transmission image P2 to generate a difference image obtained by extracting the difference between the first transmission image P1 and the second transmission image P2. The control unit 10 determines whether or not a luminance value greater than the first threshold value is present in the luminance distribution of the difference image and detects the first foreign matter when the luminance value greater than the first threshold value is present. In addition, the control unit 10 determines whether or not a luminance value smaller than the second threshold value is present in the luminance distribution of the difference image and detects the second foreign matter when the luminance value smaller than the first threshold value is present. Then, the control unit 10 stores the determination results. In addition, when it is determined that the article G includes at least one of the first foreign matter and the second foreign matter, the article G is determined to be defective and is sorted out of the production line by the sorting device (not shown).

As described above, in the X-ray inspection device 1, it is found that, in the difference image, the first foreign matter having a higher specific gravity than the article G appears bright and the second foreign matter, such as plastic, having a lower specific gravity than the article G appears dark. Therefore, in the X-ray inspection device 1, two threshold values for foreign matter inspection based on the difference image are provided. The X-ray inspection device 1 can detect the first foreign matter using the first threshold value, which is one of the two threshold values, and detect the second foreign matter using the other second threshold value. That is, it is possible to detect both a foreign matter having a higher specific gravity than the article G and a foreign matter having a lower specific gravity than the article G.

The X-ray inspection device 1 includes the display operation unit 8 that receives the user input, and the first threshold value and the second threshold value can be individually set through the display operation unit 8. In this case, it is possible to set each of the first threshold value and the second threshold value to a desired value and to easily respond to the detection of various first and second foreign matters.

In the X-ray inspection device 1, the control unit 10 detects the foreign matter on the basis of the luminance distribution of the difference image. In this case, it is possible to detect both the first foreign matter and the second foreign matter using the luminance distribution of the difference image.

In the X-ray inspection device 1, the first threshold value is a luminance value that is greater than the reference luminance value corresponding to the article G, and the second threshold value is a luminance value that is smaller than the reference luminance value. The control unit 10 detects the first foreign matter when there is a luminance value greater than the first threshold value in the luminance distribution of the difference image and detects the second foreign matter when there is a luminance value smaller than the second threshold value in the luminance distribution of the difference image. In this case, it is possible to detect both the first foreign matter and the second foreign matter specifically using the luminance distribution of the difference image.

The embodiment has been described above. However, one aspect of the invention is not limited to the above-described embodiment, and various modifications can be made without departing from the scope of the invention.

In the above-described embodiment, the first threshold value and the second threshold value are not particularly limited and may be various values. In the above-described embodiment, at least one of the first threshold value and the second threshold value may be a fixed value or may be a variable value that varies depending on other parameters. In the above-described embodiment, the second foreign matter may be detected when there is a luminance value greater than the first threshold value in the luminance distribution of the difference image, and the first foreign matter may be detected when there is a luminance value smaller than the second threshold value in the luminance distribution of the difference image.

In the above-described embodiment, the first threshold value and the second threshold value may be luminance values greater than the reference luminance value. In this case, the control unit 10 may detect one of the first foreign matter and the second foreign matter when there is a luminance value greater than the first threshold in the luminance distribution of the difference image, invert the positive and negative of the luminance distribution of the difference image, and detect the other of the first foreign matter and the second foreign matter when there is a luminance value greater than the second threshold value in the inverted luminance distribution. Alternatively, the first threshold value and the second threshold value may be luminance values smaller than the reference luminance value. In this case, the control unit 10 may detect one of the first foreign matter and the second foreign matter when there is a luminance value smaller than the first threshold value in the luminance distribution of the difference image, invert the positive and negative of the luminance distribution of the difference image, and detect the other of the first foreign matter and the second foreign matter when there is a luminance value smaller than the second threshold value in the inverted luminance distribution. Even In this modification example, it is possible to detect both the first foreign matter and the second foreign matter specifically using the luminance distribution of the difference image.

In the above-described embodiment, the X-ray detection unit 7 is configured to detect X-rays in two bands. However, the invention is not limited thereto. For example, the X-ray detection unit 7 may be configured to detect X-rays in three or more bands. In this case, the X-ray detection unit 7 may determine whether or not a foreign matter is present or absent in the article G using X-rays in three or more bands.

In the above-described embodiment, the X-ray inspection device 1 has the control unit 10. However, the invention is not limited thereto. For example, at least some of the functions of the control unit 10 may be implemented in an external control device (for example, a laptop PC, a tablet, or a server) that can communicate with the X-ray inspection device 1 wirelessly or in a wired manner. Each configuration in the above-described embodiment or modification example can be arbitrarily applied to each configuration in other embodiments or other modification examples.

What is claimed is:

1. An X-ray inspection device comprising:
   a transport unit configured to transport an article;
   an X-ray irradiator configured to irradiate the article transported by the transport unit with X-rays;
   an X-ray detection unit configured to detect the X-rays, which have been emitted by the X-ray irradiator and transmitted through the article, in each of a plurality of energy bands; and
   a processor configured to
      generate a plurality of X-ray transmission images on the basis of the X-rays in each of the plurality of energy bands detected by the X-ray detection unit; and
      inspect whether or not a foreign matter is present or absent in the article on the basis of a luminance distribution of a difference image between the plurality of X-ray transmission images,
   wherein the the processor is configured to detect a first foreign matter having a higher density than the article using a first luminance threshold value and to detect a second foreign matter having a lower density than the article using a second luminance threshold value different from the first luminance threshold value.

2. The X-ray inspection device according to claim 1, further comprising:
   an input unit configured to receive a user input, wherein the first luminance threshold value and the second luminance threshold value are capable of being independently set through the input unit.

3. The X-ray inspection device according to claim 1, wherein the first luminance threshold value is a luminance value that is greater than a reference luminance value corresponding to the article, the second luminance threshold value is a luminance value smaller than the reference luminance value, and the the processor is configured to detect one of the first foreign matter and the second foreign matter when there is a luminance value greater than the first luminance threshold value in the luminance distribution of the difference image and to detect the other of the first foreign matter and the second foreign matter when there is a luminance value smaller than the second luminance threshold value in the luminance distribution of the difference image.

4. The X-ray inspection device according to claim 1, wherein the first luminance threshold value and the second luminance threshold value are luminance values that are greater or smaller than a reference luminance value corresponding to the article, and the the processor is configured to detect one of the first foreign matter and the second foreign matter when there is a luminance value greater or smaller than the first luminance threshold value in the luminance distribution of the difference image, to invert positive and negative of the luminance distribution of the difference image, and to detect the other of the first foreign matter and the second foreign matter when there is a luminance value greater or smaller than the second luminance threshold value in the inverted luminance distribution.

* * * * *